United States Patent
Hsu et al.

(10) Patent No.: US 6,170,986 B1
(45) Date of Patent: Jan. 9, 2001

(54) LINEAR MOTION ROLLING GUIDE DEVICE

(75) Inventors: Ming-Che Hsu, Taipei; Shyuan-Jye Chen, Taichung; Chih-Chieh Hong, Yuan-Ho Taipei Hsien; Kuei-Hsin Chang, Chu Tung Hsinchu Shien, all of (TW)

(73) Assignee: Chieftech Precision Co., Ltd., Chung-Li City (TW)

( * ) Notice: Under 35 U.S.C. 154(b), the term of this patent shall be extended for 0 days.

(21) Appl. No.: 09/287,967

(22) Filed: Apr. 7, 1999

(51) Int. Cl.[7] ................................................. F16C 31/06
(52) U.S. Cl. ................................. 384/15; 384/13; 384/45
(58) Field of Search ................................ 384/13, 15, 43, 384/44, 45

(56) References Cited

U.S. PATENT DOCUMENTS

| | | | |
|---|---|---|---|
| Re. 35,323 | * | 9/1996 | Ohtake ..................................... 384/15 |
| 4,637,739 | * | 1/1987 | Hattori ..................................... 384/45 |
| 5,080,498 | * | 1/1992 | Tsukada ................................... 384/15 |
| 5,102,235 | * | 4/1992 | Mugglestone ........................... 384/45 |
| 5,340,219 | * | 8/1994 | Agari ....................................... 384/15 |
| 5,435,649 | * | 7/1995 | Kuwahara ............................... 384/13 |
| 5,451,109 | * | 9/1995 | Ichida ...................................... 384/15 |
| 5,951,168 | * | 9/1999 | Teramachi et al. ..................... 384/45 |

FOREIGN PATENT DOCUMENTS

| 19538665 | * | 4/1997 | (DE) . |
|---|---|---|---|
| 474948 | * | 3/1992 | (EP) . |

* cited by examiner

Primary Examiner—Thomas R. Hannon
(74) Attorney, Agent, or Firm—W. Wayne Liauh

(57) ABSTRACT

A linear motion guide device includes a rail, a slider and a plurality of rolling elements. Two identical injection molded side frames having two end-plates with convex half-roundness on both ends of a longitudinal arranged profiled member with the same length as steel body, are bilaterally attached to the outside of the elongation of the steel body and the steel body is longitudinally situates inside and attached to the endplate. At least one return passage of the rolling elements is provided outside of the elongation of the steel body. A pair of end caps with concave half-roundness and end seals is externally attached to the endplates. The steel body, the side frames, and the end caps having means for attachment are therefore properly positioned to each other. A compact sealing design is also provided.

16 Claims, 6 Drawing Sheets

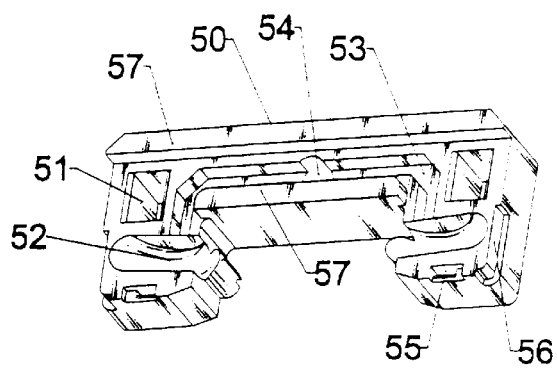
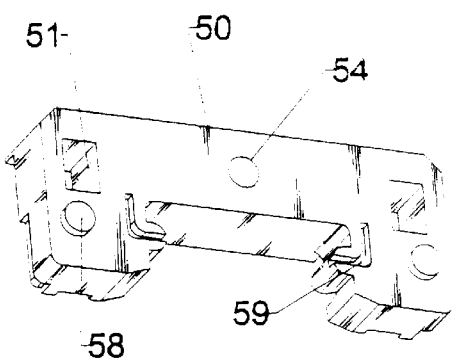
Fig. 6         Fig. 7
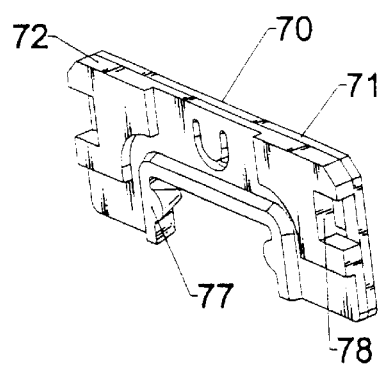
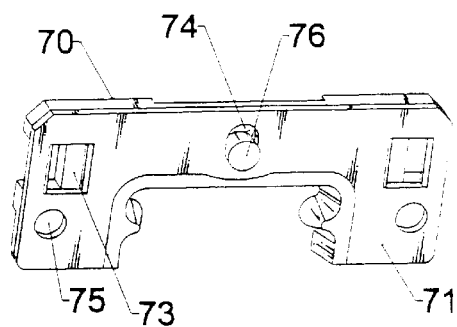
Fig. 8         Fig. 9

LINEAR MOTION ROLLING GUIDE DEVICE

BACKGROUND OF THE INVENTION

The present invention relates to a linear rolling guide device suitable for relatively small equipment including office automation and measuring equipment.

In the conventional design a linear motion rolling guide assembly has a rail and a slider, through the rolling of a plurality of rows of rolling elements, riding and sliding on the rail.

The slider includes a steel body with an elongation extending downwards on both sides of a steel plate. A plurality of pairs of longitudinally arranged grooves, provided as tracks of the rolling elements, are formed on inside faces of the elongation. A plurality of pairs of holes as return passages of the rolling elements is drilled through the elongation. Two end caps, including the turnaround channel, which connects the track of rolling elements and the return holes, are mounted on both end faces of the steel body by fixing screws.

The smaller the hole is, the more difficult it is to drill. To overcome the manufacturing difficulty designs of return hole, formed by an open groove and a closure, member are provided, see the U.S. Pat. No. 4,637,739, and European patents EP 0 494 682 A2 and EP 0 474 948 A1.

EP 0 494 682 A2 and EP 0 474 948 A1, taught an alternative design which simplifies the manufacture and mounting complexity.

In the EP 0 494 682 A2 the disclosed interlocking design by using a snapping means, which is integrally formed on the longitudinal end of the closure member of the return track, to fix two monolithically end caps with a return track. The space of the snap means is limited by the shape of the closure member, which is also constrained laterally by the mounting holes for the connection of the surrounding part designed to slide relative to the rail, and vertically by the fitting edge for the surrounding part. A firm interlocking of the snap means, especially for the small size linear rolling guide device, is difficult to achieve.

In DE 195 38 665 A1 another snapping design is disclosed. A casement enfold the bottom of the steel body and form the ball return tracks space in between, two end caps are inserted vertically from top into the axial space between the endplate of the casement and the end face of the steel body. These two end caps press the steel body down to the casement by the projection overhead and are fastened vertically on the casement by using a snapping mean on the endplate of the casement and the outside face of the end cap. The casement provides positioning surfaces for the steel body and the end caps, respectively. A disadvantage of this is the indirect positioning between the end caps and the steel body. This elnarges the misalignment between the return channel and the turn-around channels of the rolling elements and causes an unsatisfactory rolling element re-circulation.

The conventional and economical fabrication of the precision plastic injection molding can achieve an positioning and form accuracy of ca. ±0.02 mm relative to a length 0.5~1.5 mm; and the minimal fillet radius/chamfer can achieve an accuracy of 0.1 mm. Any higher accuracy requirement will substantially increase the manufacturing cost. Such inaccuracy and the minimum fillet limit the minimization of the linear motion rolling guide device. A firm and accurate interlocking is secured only if the fitting surfaces of the parts to be attached together are large enough and are precisely conformed to each other. The smaller the linear motion rolling guide device is, the smaller is the fitting surface. This also limits the maximum extent of minimization of the dimensions.

SUMMARY OF THE INVENTION

Therefore, the object of this invention is to provide a linear guide device to solve the above mentioned problems and to furthermore minimize the dimensions thereof without increasing the manufacturing cost.

According to the above-mentioned object there is provided a linear motion rolling guide device including a longitudinal extended rail, a plurality of rows of rolling elements, a slider. By means of the rolling of the rolling elements between the raceway on the right-and-left side of the rail and the opposite facing race way on the slider, the linear motion rolling guide device slides relative to the rail. The slider further includes a steel body with an elongation extending downward on both sides of a base plate. The outside surface of the elongation, provided as the fitting and positioning surface for the attachment of the side frames, has a forcipiform with an opening laterally towards outside.

A pair of injection molded side frames are provided each has a longitudinally arranged profiled member having the same length as the steel body and two transversely arranged end plates on both end of the profiled member in one single mold. The profiled member, bilaterally engaged into the forcipiform of the elongation, are vertically fixed to the steel body when the fitting profile are laterally and fixedly attached to the outside surface of the elongation. The full use of the outside surface of the elongation as fitting surface provides a firmer attachment between the side frames and the steel body. This design can further minimize the dimensions of the linear rolling guide device, compared to those without full use of the outside surface as fitting surface. At least one longitudinally arranged all-round closed hole is formed inside the profiled member as the return passage of the rolling elements.

The endplates longitudinally constraining the steel body in between are formed by a transversely arranged base plate, perforated by the return passage and has at least one convex half-roundness on the base plate, stretching from the inside surface of the return passage without any misalignment in between and provided as the internal guiding surface of the turnaround channel.

Two end caps are externally attached to the endplates, each has at least one pair of concave half-roundness. The two end caps, together with the convex half-roundness, form a closed turnaround channel. The end of the concave half-roundness aligns to the end of the return passage more precisely by direct positioning between the end caps and the side frames. This brings a smoother running of the rolling element re-circulation.

The steel body, the side frames, and the end caps have means for attachment and positioned to each other.

Such means of attachment is preferably formed by an interlocking means on the endplates, such as tenon, and a pair of its counterparts on the end caps, such as slots. The end caps interlock the two side frames crossly together by engaging the interlocking means on the endplates with their counterparts on the end caps. As a result the two opposed side frames are forced to approach each other to within a certain distance defined by the distance between the two counterparts. The width of the two opposed outside surface of the elongation of the steel body is designed to meet the distance between the two opposing side frames so that the side frames are firmly attached to and clamp the steel body bilaterally tightly with a certain pressure. The end caps are also transversely and fixedly fixed and positioned to the side frames through the engagement of the interlocking means and their counterparts. The engagement between the positioning means, preferably the same as the interlocking means, on the endplates and their inter-fitting means, preferably the same as the counter parts, on the end caps, brings a direct positioning between the end caps and the side frames. A pair of snap means is longitudinally integrated on the endplates, preferably direct on the counterparts, such as tenon, for saving space, to interlock the end caps on the front and rear end of the slider longitudinally without using screws.

The side frames are fabricated by an injection molding process from engineering plastic or with metallic powder having a molding die with additional bilaterally sliding dies. The through holes as return passage of the rolling elements are injection molded by a through pin having the same form as and a length slightly longer than the through hole. The through pin is integrated on a molding die of the endplate. On the other molding die of the endplate a guiding hole is provided. The end of the through pin is precisely engaged and supported by the guiding hole when the molding dies are closed. The outside form of the profiled member is injection-molded from another different molding dies.

In an alternative embodiment the longitudinally arranged return passage is near half closed by the profiled member. The rest near half surface of the through holes are form by a portion of the outside surface of the elongation of the steel body. Such design simplifies the molding dies without the need of the through pin on one side, but on the other side the outside surface of the elongation is only partially used as fitting surface. The near half surface of the return passage provided by the profiled member becomes part of and is thereof injection-molded together with the outside form of the profile member. The rest portion profile of the profiled member is still provided as fitting surface for the attachment to the elongation of the steel body. The necessary accurate alignment of the perforated hole on the endplates to the concave half-roundness of the end caps and the through hole respectively for the smooth running of the rolling elements is achieved by the direct positioning of the side frames and the end caps and steel body.

Two end seals are formed by a rigid layer such as steel sheet, having a pair of slots, and an elastic layer such as molded by rubber. The end seals will be longitudinally fixed attached to the outer end of the end caps through the engagement of the slots with the same snap means on the endplate of the side frames on the slider. Because of the dimension of the small sized linear rolling guide device the lubrication hole can not be attached with a grease nipple any more. The elastic layer is molded with a plug, having the same form as and aligning to the lubrication hole on the end caps of the slider and partially connected with the elastic layer and thereof can be unfolded for lubrication injection and plugged into the lubrication hole after the lubrication injection is fulfilled, so that the leakage of the lubricant from the lubrication hole is prevented. The elastic layer comprises a sealing lip, having the same shape as the profile of the rail, which provides a contact sealing effect.

A pair of under seals are provided each has a thin rigid back, such as steel sheet, and an elastic layer, such as molded from rubber. To achieve the same rigidity as the thick rigid back, a rib is bent along on the longitudinally outer edge of the thin rigid back. On the both ends of the rigid back, a projection is bent vertically upwards and then longitudinally outwards. The under seals are fastened and positioned to the slider by inserting the projections into the recess on the bottom of the end caps. As an alternative embodiment, the projections are inserted into the recesses formed on the end seals. Such an interlocking design allows the bottom of the end caps and the end seals to have the same height as the bottom of the steel body and does not reduce any space of the clearance from the bottom of the rail to the bottom of the slider. Any clearance will only reduce the thickness of the under seals when the under seals are mounted. A compact design is thereof achieved. The elastic layer provides a longitudinally extended sealing lip to prevent the dusts or particles entering into the raceway of the rolling elements from bottom.

To prevent the dropout of the rolling elements when separating the slider from the rail, a retainer, having a straight portion and two holding portions on both ends, respectively, made from a steel string or wire is provided. Through the accurate positioning of the holding porting to the end caps the longitudinally arranged straight portion is situated in the same height as the rolling elements vertically and in the adjacent outside of the rolling elements laterally. Whereas the width between the retainer and the edge of the raceway of the steel body is smaller than the diameter of the rolling elements and rolling elements are thereof hold in between. An escaping recess on the raceway of the rail is provided, so that there is no contact between the rail and the retainer happened when the slider slides on the rail. The holding portion has a first portion transversely and laterally bent outward and a second portion transversely and vertically bent upward. The vertical and the lateral positionings of the retainer are defined by the engagement of the recesses on the outer end of the end caps with the first and the second portion respectively.

BRIEF DESCRIPTION OF THE DRAWINGS

Other objects, features, and advantages of the invention will become apparent from the following detailed description of the preferred but non-limiting embodiments. The description is made with reference to the accompanying drawings in which:

FIG. 6 is a perspective view from front end of the end cap.

FIG. 7 is a perspective view from rear end of the end cap.

FIG. 8 is a perspective view from front end of the end seals.

FIG. 9 is a perspective view from rear end of the end seals.

DESCRIPTION OF THE PREFERRED EMBODIMENTS

Figure 1:
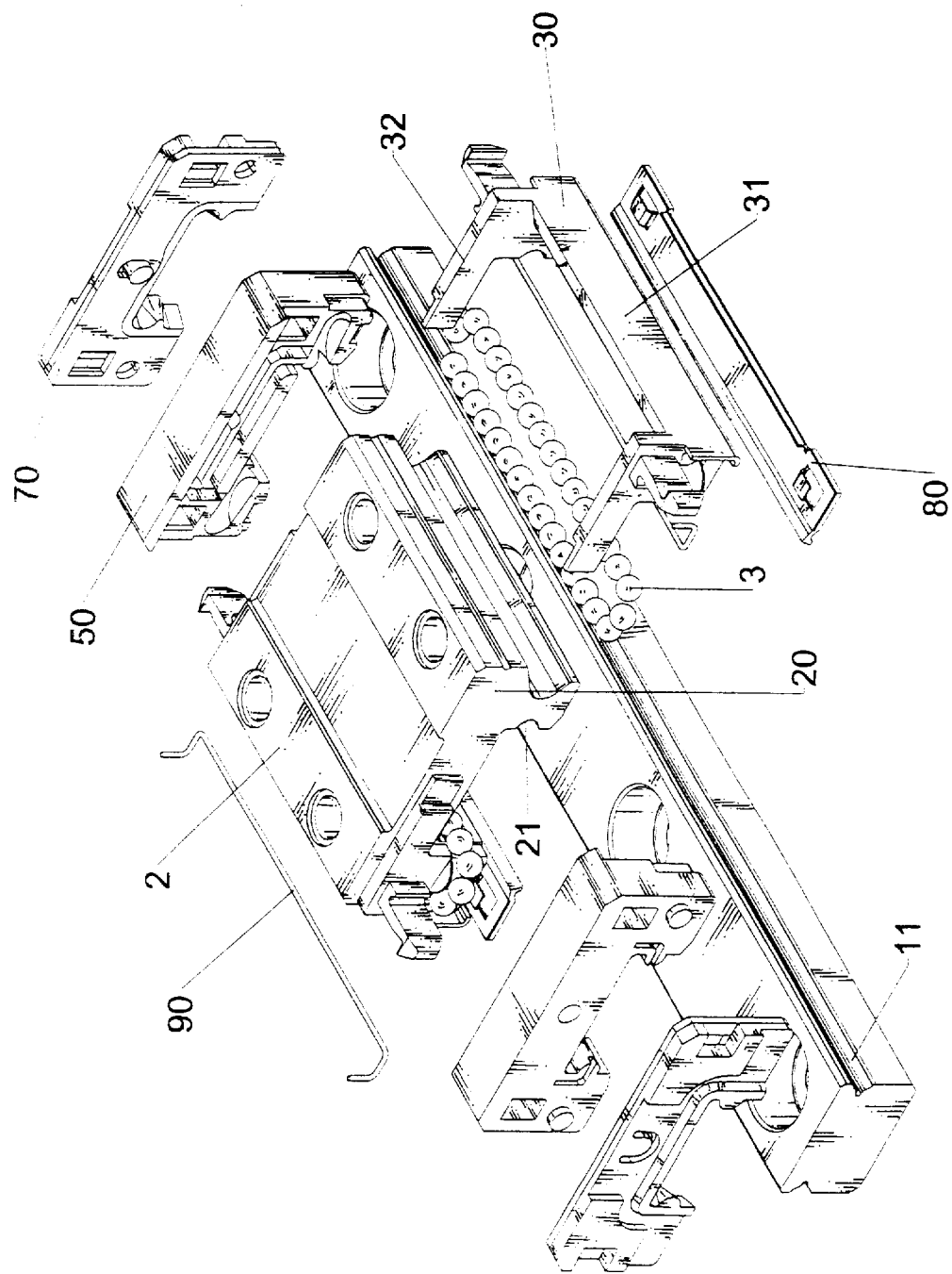
FIG. 1 is a perspective view of the explosive linear motion rolling guide device of the present invention.

Referring to the drawings FIG. 1 shows a linear motion rolling guide device which includes a longitudinally extended rail 1, a plurality of rows of rolling elements 3, a slider 2, and, by means of the rolling of the rolling elements between the raceway 11 on the right-and-left side of the rail and the opposite facing race way 21 on the slider 2, slides relative to the rail. The slider 2 further includes a steel body 20, a pair of side frames 30 having a profiled member 31 and two transversely arranged endplates 32 on both ends bilaterally mounted to the steel body 20. The steel body 20 is situated between the two endplates 32. A pair of end caps 50 are longitudinally attached to the slider 2 from fore-and-rear end, and the steel body, the pair of side frames and the pair end caps 50 have means for attachment and positioning to each other; a pair of end seals 70 attached to the outer end of the end caps 50 and a pair of the under seals 80 having a contact sealing lip 85 (shown in FIG. 8) to the right-and-left side surface of the rail 1 attached to the bottom of the slider 2.

Figure 2:
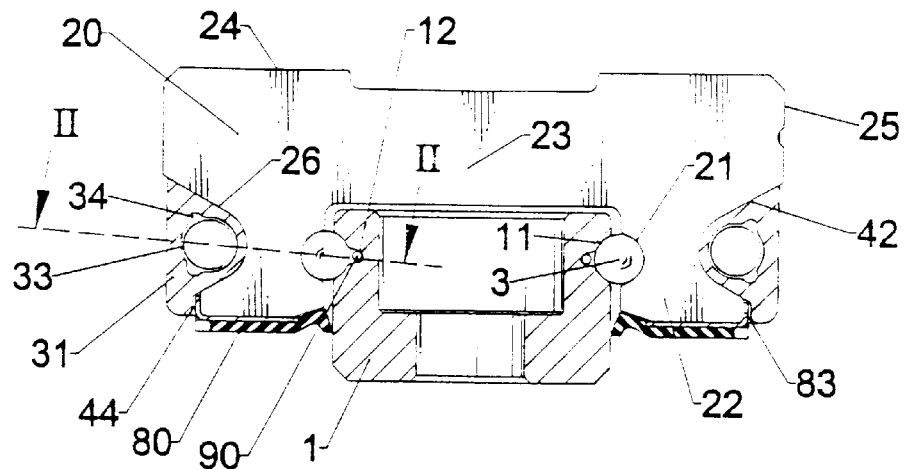
FIG. 2 is a cross-section view taking along the middle of the slider

Referring to FIG. 2, the steel body 20 has two elongations 22 extending downwardly on both sides of a base plate 23. The mounting face on the top 24 and side 25 for the connection to the surrounding parts are designed to slide relative to the rail 1 and the longitudinally arranged grooves 21 as raceway of the rolling elements 3 on the inside surface of the elongation 22 of the steel body 20. The outside surface 26 of the elongation 22, provided as the fitting and positioning surface for the attachment of the side frames 30, has a forcipiform with an opening laterally disposed towards the outside.

A pair of side frames 30, having the fitting profile 42 on the outside surface of the profiled member 31, are firmly engaged into the forcipiform of the elongation 22 bilaterally and are vertically fixed and positioned to the steel body 20, when the fitting profile 42 are laterally fixed attached to the outside surface 26 of the elongation 22. The full use of the outside surface 26 of the elongation as fitting surface provides a firmer attachment between the side frames 30 and the steel body 20. The dimensions of the linear rolling guide device can therefore be further minimized as compared to those without full use of the outside surface 26 as fitting surface. At least one longitudinally arranged all-round closed hole 33 is formed inside the profiled member 31 as the return passage of the rolling elements 3.

Figure 3:
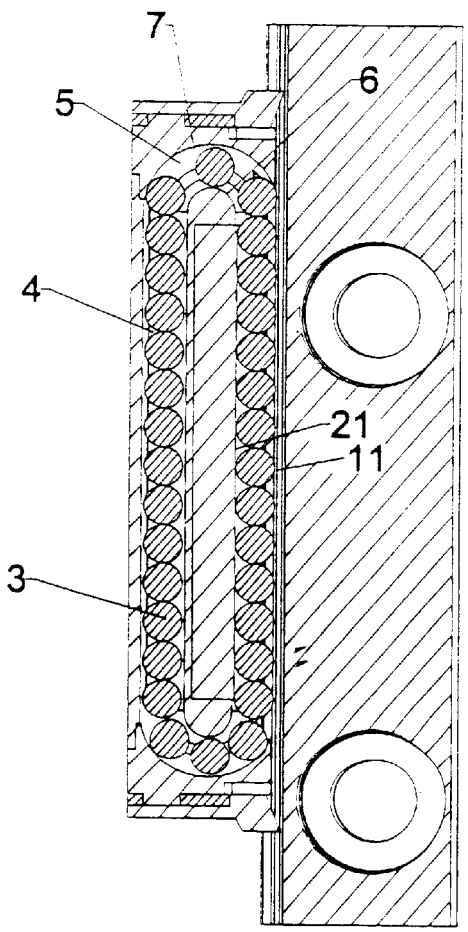
FIG. 3 is a sectional view taking along II—II in FIG. 2 for description of the ball re-circulation.

Referring to FIG. 3, at least one pair of turnaround channel 5 on each side of the steel body 20, formed by an internal guiding surface 6 and an outer guiding surface 7, are connected endwise with and aligned to the raceway grooves 11, 12 and the return passage 4, to form a circulation passage way for the re-circulation of the rolling elements 3. Through the re-circulation of the rolling elements 3, the slider 2 can slide endless on the rail 1.

Figure 4A:
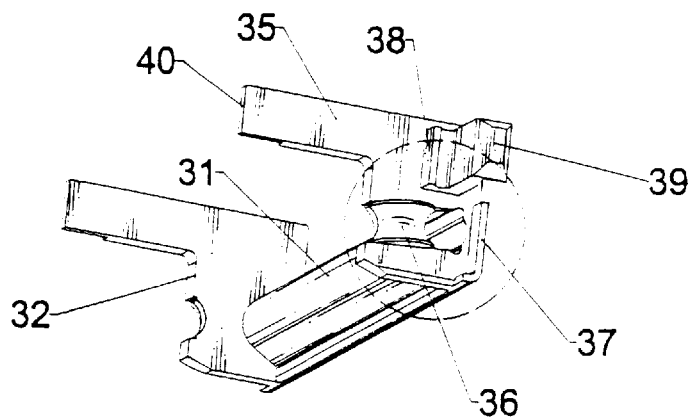
FIGS. 4A and 4B is a perspective view of the side frame.
Figure 4B:
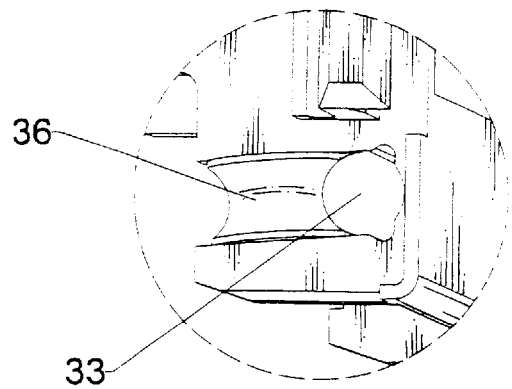

Referring to FIGS. 4A and 4B, the pair of side frames 30 are identical with respect to each other and each includes a longitudinal arranged profiled member 31, having the same length as the steel body 20, and two crossly arranged endplates 32 on both end of the profiled member 31 injected in one mold. This way, at least one longitudinally arranged all-around closed through-hole 33 as return passage of the rolling elements 3 is provided inside the profiled member 31. The rolling elements 3 runs inside the profiled member 31 without any contact with the steel body 20. This design provides a smoother running and less noise.

At least one longitudinally arranged groove 34, directly attaching to the return passage 33, is provided for the lubricant deposit, the rolling elements are lubricated each time when they run into the return passage 33 by re-circulation. The position of the groove 34 is designed such that the difference of the wall thickness of the profiled member 31 is kept uniform.

The endplates 32 are formed by a transversely arranged base plate 35, perforated by the return passage 33 and the lubricant deposit groove 34, on which at least one convex half-roundness 36, stretching from the inside surface of the return passage 33, is provided as the internal guiding surface 6 of the turnaround channel 5, a longitudinal extended side wall 37.

A longitudinally extended firm interlocking mean such as tenon 38 is integrated and rooted on the base plate 35, such that, independent of the profiled member 31, the tenon 38 can be designed as robust as required. A snap means 39 is longitudinally arranged and integrated on the base plate 35, preferably direct on the tenon 38 for saving the space, for the interlocking of the end caps 50. The endplates 32 longitudinally constrain the steel body 20 in between.

A pair of counter parts of the interlocking means such as slots 51 formed on the end cap 50. When the tenon 38 and the slots 51 are connected, the end caps 50 bring the opposedly arranged side frames 30 closely toward each other bilaterally and to a certain distance defined by the distance between the two slots 51. The distance between the two opposing outside surfaces 26 of the elongation of the steel body is designed to match the distance between the two opposing side frames 30 so that side frames 30 are firmly attached to and clamped the steel body 20 bilaterally tightly.

A pair of extending walls 37, each extending from the lateral side of profiled member 31 longitudinally, secure the joint of the turnaround channel 5 and the return passage 4 being covered inside the side frames 30 and avoid a direct invasion of dusts into the turnaround channel 5 and the return passage 4.

The side frames 30 are fabricated by conventional injection molding technique using engineering plastic or metallic powder having a molding die with additional bilateral sliding dies. The through holes 33 as a return passage of the rolling elements and the lubricant deposit groove 34 are injection molded by a through pin having the same form as, but with a length slightly longer than, the through hole 33 and the lubricant deposit groove 34. The through pin is integrated on the molding die of one of the endplates; on the molding dies of the other endplate a guiding hole for the through pin is provided. The end of the through pin is precisely engaged and supported by the guiding hole when the molding dies are closed. The outer form of the profiled member 31 and the form of the endplates 32, including the tenon 38, snap mean 39, extending wall 37, convex half-roundness 36, etc. are injection molded on different molding dies and thereof without any interaction to each other and able to be designed independently.

Figure 5:
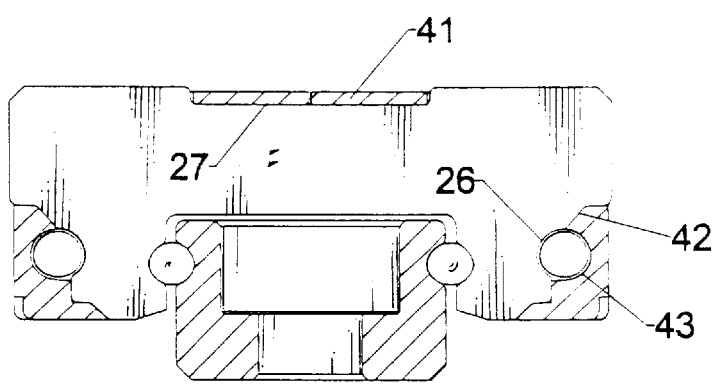
FIG. 5 is a cross-sectional view taking along the middle of the slider showing another example with near half-enclosed through hole.

Referring to FIG. 5, alternatively the longitudinally arranged through holes 33 as the return passage of the rolling elements 3 are only near half closed by the profiled member 31. The rest near half surface of the through holes are formed by a portion of the outside surface 26 of the elongation of the steel body 20. The surface 43 having near half close the through hole becomes a part of the fitting surface 42 of the profiled member 31 and is injection molded together with the fitting surface 42 of the profiled member 31 in one molding die. Such design simplifies the molding dies without the need of the through pin. A forcipiform of the outside surface 26 of the elongation for the attachment between the steel body 20 and the side frames 30 is sometimes hardly to be fulfilled by using portion of them to form the rest near half surface of the through holes 33. A constraining means such as a projection 41 overhead to press the steel body 20 vertically downward is therefore required. The projections overhead 41, longitudinally extended from the top of the endplates 32 are engaged into the recess 27 on both ends of the top face of the steel body 20 and press the steel body 20 from the top vertically downward to provide a firm contact and exact positioning to the profiled member 31. The rest portion profile of the profiled member 42 is still provided as fitting surface for the attachment to the elongation 22 of the steel body. The necessary accurate alignment of the perforated hole on the endplates 32 to the concave half-roundness 52 of the end caps and the through hole 33 respectively for the smooth running of the rolling elements 3 is achieved by the direct positioning of the side frames 30 to the end caps 50 and steel body 20 respectively.

Referring to FIGS. 6 and 7, the end caps 50 include at least one pair of concave half-roundness 52, at least one pair of counterparts of the interlocking means on the endplates such as slots 51, a right-and-left symmetric arranged lubrication channel 53, a lubrication hole 54, and a pair of longitudinally arranged rectangular recess 55 on the bottom of the inside a guiding hole for the through pin is provided. The end of the through pin is precisely engaged and supported by the guiding hole when the molding dies are closed. The outer form of the profiled member 31 and the form of the endplates 32, including the tenon 38, snap mean 39, extending wall 37, convex half-roundness 36, etc. are injection molded on different molding dies and thereof without any interaction to each other and able to be designed independently.

Referring to FIG. 5, alternatively the longitudinally arranged through holes 33 as the return passage of the rolling elements 3 are only near half closed by the profiled member 31. The rest near half surface of the through holes are formed by a portion of the outside surface 26 of the elongation of the steel body 20. The surface 43 having near half close the through hole becomes a part of the fitting surface 42 of the profiled member 31 and is injection molded together with the fitting surface 42 of the profiled member 31 in one molding die. Such design simplifies the molding dies without the need of the through pin. A forcipiform of the outside surface 26 of the elongation for the attachment between the steel body 20 and the side frames 30 is sometimes hardly to be fulfilled by using portion of them to form the rest near half surface of the through holes 33. A constraining means such as a projection 41 overhead to press the steel body 20 vertically downward is therefore required. The projections overhead 41, longitudinally extended from the top of the endplates 32 are engaged into the recess 27 on both ends of the top face of the steel body 20 and press the steel body 20 from the top vertically downward to provide a firm contact and exact positioning to the profiled member 31. The rest portion profile of the profiled member 42 is still provided as fitting surface for the attachment to the elongation 22 of the steel body. The necessary accurate alignment of the perforated hole on the endplates 32 to the concave half-roundness 52 of the end caps and the through hole 33 respectively for the smooth running of the rolling elements 3 is achieved by the direct positioning of the side frames 30 to the end caps 50 and steel body 20 respectively.

Referring to FIGS. 6 and 7, the end caps 50 include at least one pair of concave half-roundness 52, at least one pair of counterparts of the interlocking means on the endplates such as slots 51, a right-and-left symmetric arranged lubrication channel 53, a lubrication hole 54, and a pair of longitudinally arranged rectangular recess 55 on the bottom of the inside surface. The end caps 50 interlock the two side frames 30 crossly together by connecting the tenon 38 on the endplates 32 with the slots 51 on the end caps 50. The side frames 30 are approached against each other to a certain distance defined by the distance between the two slots 51. The distance of the two opposing outside surfaces 26 of the elongation of the steel body is designed to match the distance between the two opposed side frames 30 so that the side frames 30 are therefore firmly attached to and clamped to the steel body 20 bilaterally tightly with a certain pressure predefined. The end caps 50 are also transversely and fixedly attached to the side frames 30 through the connection of the tenon 38 and the slots 51. The end caps are positioned directly to the side frames through the engagement of the positioning means on the endplates, preferably the same parts as the tenon 38, and its inter-fitting mean, preferably the same parts as the slots 51. A pair of recesses 56 on both lateral side surfaces of the end caps 50 are provided for the engagement of the side wall 37 on the endplates. A pair of the rectangular recesses 55 with an opening from the bottom of the inside surface and extending vertically upwards then longitudinally outwards are provided for the engagement with the projections on both end of the underseals.

The concave half-roundness 52 on the end caps 50, as the outer guiding surface of the turnaround channel 7, together with the convex half-roundness 36 on the endplates 32, directly stretching from the inside surface of the return passage without any misalignment in between, forms a closed turnaround channel 5. The end of the concave half-roundness 52 is therefore more precisely aligned to the end of the through hole 33 as return passage through the direct positioning between the end caps 50 and the side frames 30. This design brings a more smooth-running of the rolling elements re-circulation.

A lubrication hole 54 is provided in the middle of the end cap 50 and a right-and-left symmetric arranged lubrication channel 53 connects the lubrication hole 54 and the turnaround channel 5 on bilateral side, so that lubricant can be refilled from the lubrication hole 54 into the re-circulation passage ways of the rolling elements 3. The base plate 35 of the end plate closes the lubrication channel 53 when the end cap 50 is interlocked together with the side frames 30. To avoid the leakage of lubricant from the joint gap of the base plates of the two opposed endplates 32, a design of the laterally extended projections 40 having longitudinal overlap to each other and a design with overhangs 57 from the end cap 50 to close the joint gap on top an bottom are provided.

Figure 10:
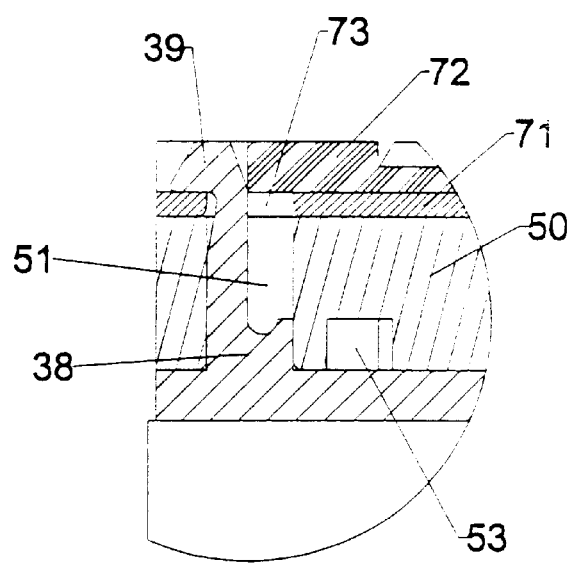
FIG. 10 is a partial transverse-sectional view of the portion of the snap interlocking between the side frame, the end cap and the end seal.

Referring to FIGS. 8 and 9, two end seals 70 are formed by a rigid layer 71, such as steel sheet, and an elastic layer 72, such as molded by rubber. The rigid layer 71 has two slots 73 on bilateral side, which will be longitudinally engaged by the snap means 39 on the endplate of the side frames. The end seals 70 with the end caps 50 will together be longitudinally interlocked on the slider 2 by means of the snap means 39 without using any screw. Two positioning holes 75 on the steel back engage the positioning pins 58 formed on the end caps 50 and the end seals 70 are thereof vertically and transversely fixed attached and positioned to the end caps 50 tightly. The elastic layer 72 comprises a sealing lip 77, having the same shape as the profile of the rail 1, which provides a contact sealing effect to prevent any invasion of dirty particles or dusts from the front and back sides into the inside of the slider 2. The elastic layer 72 has recesses 78, which are open only in half of the slots 73 on the rigid layer 71. When the end seals 70 are longitudinally moved to the slider 2, the snap means 39 are engaged into the slots 73; the rubber layer 72 will be squeezed outward and sideward by the snap means 39. When the snap means 39 are free to rebound back to the interlocking position, the snap means 39 and the rubber layer 72, because of it elasticity, will rebound back and return to its original position. The elastic layer 72 covers the rest opening of the slots 73 and prevents the snap means 39 escaping from its interlocking position unexpectedly (shown in FIG. 10).

Figure 11:
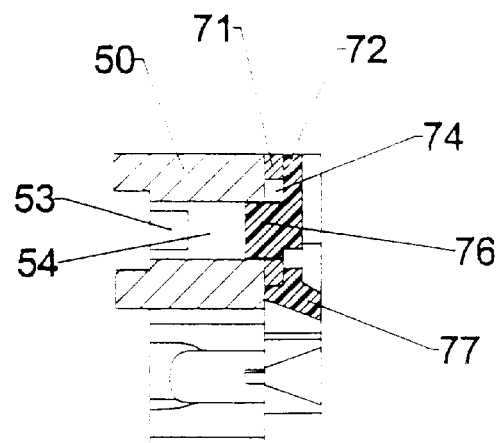
FIG. 11 is a longitudinal cross-sectional view of the portion of the plug design of the end seal mounted to the end cap.

A through hole 74 on the end seals 70 aligned to the lubrication hole 54 on the end caps 50 is provided so that lubricant can be charged into the lubrication channel 53 of the end caps 50 from outside. Because of the dimension of the small sized linear rolling guide device, the lubrication hole 54 cannot be attached with a grease nipple any more. Lubricant will leak from and dusts invade into the lubrication holes 54. The elastic layer 72 is molded with a plug 76, having the same form as and aligning to the lubrication hole on the end caps of the slider. The plug 76 is partially connected with the elastic layer and because of its elasticity thereof can be unfolded. The plug 76 is unfolded while lubrication injection and plugged into the lubrication hole 54 after the lubrication injection is fulfilled, so that the leakage of the lubricant from the lubrication hole 54 is prevented (shown in FIG. 11).

For the positioning of the end seals 70 to the end caps 50, a positioning pin 58 on the end caps 50 and a position hole 75 on the end seals 70 are provided.

Figure 12:
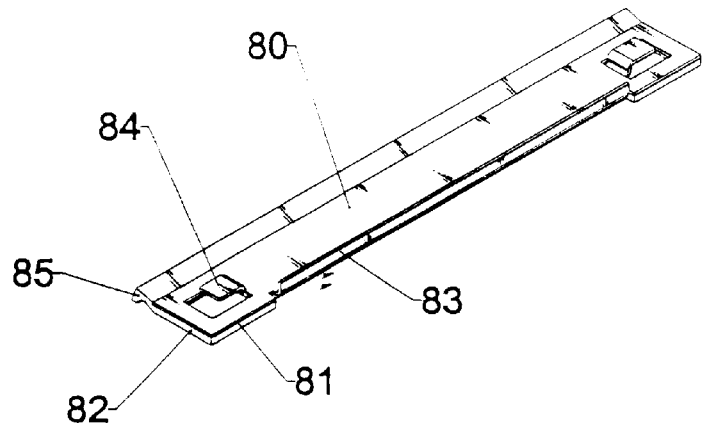
FIG. 12 is a perspective view of the under seals.
Figures 13A, 13B:
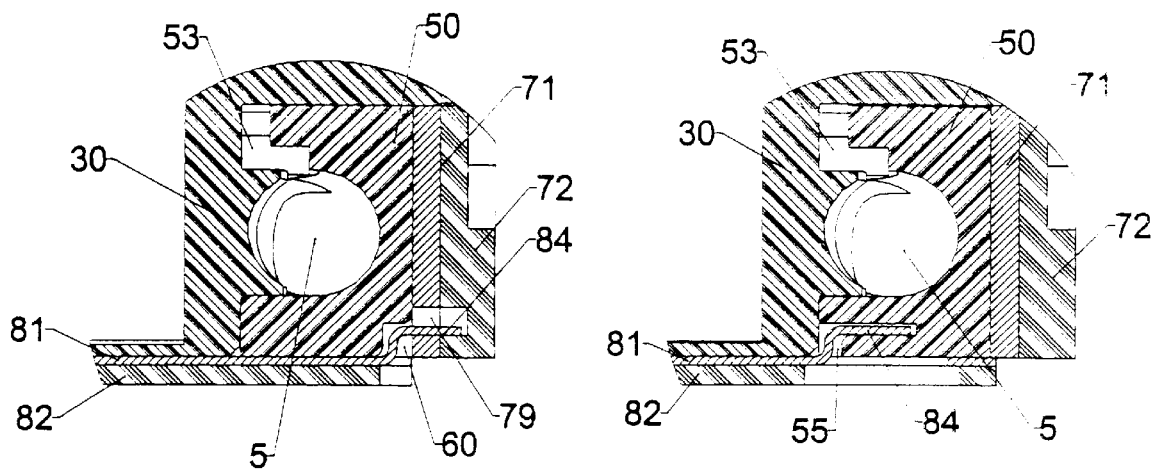
FIGS. 13A and 13B is a longitudinal cross-sectional view of the potion of the interlocking between the under seal, the end cap, the side frame and the end seal in assembly.

Referring to FIG. 12, a pair of under seals 80 with a laminated structure are provided, each has a thin rigid back 81, such as from steel sheet, instead of the usual thick rigid back and an elastic layer 82, such as molded from rubber. To have the same rigidity as the thick rigid back, a rib 83 is bent upward on the longitudinally outer edge of the thin rigid back 81. The rib is engaged with the longitudinally arranged gap 44 on the bottom between the profile member 31 and the elongation 22 of the steel body (shown in FIG. 2). The under seals 80 are laterally positioned to the slider 2. On both near ends of the rigid back 81, a projection 84 is formed and bent vertically upward and then longitudinally outward. The under seals 80 are fastened and attached to the slider by inserting the projections 84 into the rectangular recess 55 on the bottom of the end caps 50. Alternatively the projections 84 on the end of the rigid body are inserted into the recesses 79 on the bottom of the end seals 70, and an escaping recesses 60 for the upward portion of the projection 84 is formed on the adjacent end caps 50. Such an interlocking design allows the bottom of the end caps 50 and the end seals 70 to have the same height as the bottom of the steel body 20 and prevents it to occupy any space of the clearance from the bottom of the rail 1 to the bottom of the slider 2. If such clearance is not sufficient enough especially in the small size linear motion rolling guide device (1~2 mm), an interference between the slider and the mounting shoulder for the rail is subject to happen. The clearance will also only reduce the thickness of the under seals 80 when the under seals 80 are mounted. A compact design without waste the space of the clearance is thus achieved. The elastic layer 82 provides a longitudinally extended sealing lip 85, which contacts with the side surface of the guide rail 1 and prevents the dusts or particles entering into the race way 11, 12 of the rolling elements 3.

Figure 14:
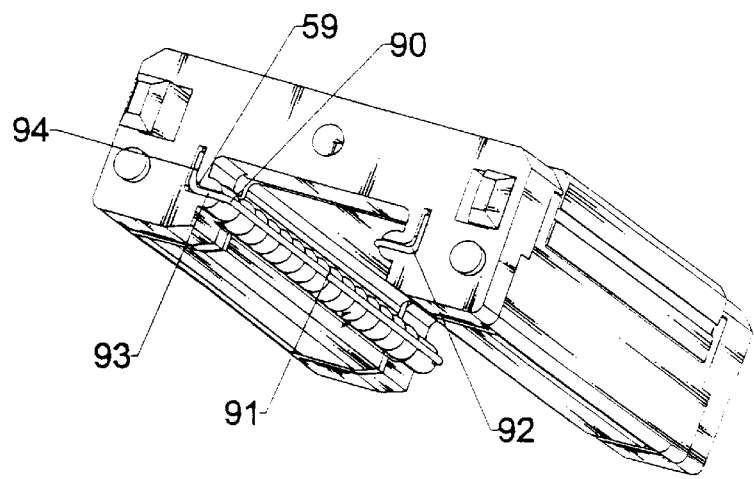
FIG. 14 is a perspective view of the retainer.

Referring to FIG. 14, to prevent the dropout of the rolling elements when separating the slider from the rail, a retainer 90, having a straight portion 91 and two holding portions 92 on both end of the straight portion, made from a steel string or wire, is provided. Through an accurate positioning of the holding porting 92 to the end caps 50 the longitudinally arranged straight portion 91 is situated in the same height as the rolling elements 3 vertically and in the adjacent outside of the rolling elements 3 laterally. The width between the retainer 90 and the edge of the raceway 21 of the steel body is smaller than the diameter of the rolling elements 3. The rolling elements 3 are therefore held in between. An escaping recess 12 on the raceway 11 of the rail is provided, so that there is no contact between the rail 1 and the retainer 90 when the slider 2 slides on the rail 1. The holding portion 92 has a first portion 93 transversely and laterally bent outward and a second portion 94 transversely and vertically bent upward. The vertical and the lateral positions of the retainer 90 are defined by the engagement of the recesses 59 on the outer end of the end caps with the first and the second portion 93, 94 respectively.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A linear motion rolling guide device comprising:
    a longitudinally extended rail including at least one raceway on both right and left sides, a plurality of rows of rolling elements and a slider, by means of the rolling of said rolling elements between the raceway of the rail and its opposite facing race way on the slider respectively, sliding relative to the rail;
    the slider further comprising:
        a steel body with two downward elongations on both sides, whose opposite inside surfaces having longitudinally extended race way grooves formed;
        a pair of identical injection molded side frames, including a longitudinally arranged profiled member having the same length as the steel body, two transversely arranged endplates, perforated by the return passage and wherefrom having a convex half-roundness stretched, on both end of the profiled member, wherein a return passage of the said rolling elements is formed and defined when the side frames are bilaterally mounted to the outer surface of the said elongation and the steel body longitudinally situated inside and attached to the endplates; and
        a pair of end caps externally attached to the said endplates, including at least a pair of concave half-roundness;
    whereby the steel body, the side frames and the end caps have means for attachment and are thereof positioned to each other and the turnaround channel, which is formed by the concave half-roundness on the end caps and the convex half-roundness on the endplates, connects thereof endwise with the said race way grooves and the said return passage to form a circulation passage way for the rolling elements re-circulation.

2. A linear motion rolling guide device according to the claim 1, wherein the means for attachment of the steel body, the side frames and the end caps include an interlocking means on the endplates and a pair of slots on the end caps;
    whereby by fitting the dimension of the width between the outside surface of the elongation to the dimension of the width between the two slots, the steel body, the side frames and the end caps are fixedly attached to each other bilaterally when the interlocking means are firmly connected with said two slots.

3. A linear motion rolling guide device according to the claim 2, wherein the outer surface of the said elongation has a forcipiform with an opening laterally toward outsides and the profiled member has a mating form to said forcipiform so that the side frames are vertically and laterally complete positioned to the steel body when the side frames are laterally fixedly attached to the steel body.

4. A linear motion rolling guide device according to the claim 2, wherein said interlocking means and said counterparts provide the positioning duty; through their engagement the end caps and the side frames are thereof direct positioned to each other.

5. A linear motion rolling guide device according to the claim 2, wherein at least one longitudinal extended snap means is integrated on the endplate of the side frame by the interlocking means.

6. A linear motion rolling guide device according to the claim 5, wherein the said snap means also fix the end seals longitudinally on the outside of the end caps by snapping the counterparts on the end seals; the end seals are transversely positioned and fixed by inserting the longitudinally arranged positioning pin on the outside surface of the end caps into the positioning holes on the end seals.

7. A linear motion rolling guide device according to the claim 6, wherein said end seals have a rigid back and an elastic layer which close the slots on the steel back to a smaller window so that an unexpected disengagement of the snap means from the interlocking position is prevented.

8. A linear motion rolling guide device according to the claim 1, wherein the longitudinally arranged closed through hole as the return passage of the rolling elements is molded inside the profiled member.

9. A linear motion rolling guide device according to the claim 8, wherein the said return passage of the rolling elements is integrated with at least one longitudinally arranged groove molded inside the profiled member for lubrication deposit.

10. A linear motion rolling guide device according to the claim 8, which further comprises a pair of under seals with a laminated structure having a thin rigid back;

a longitudinal rib is bent upwards on an outer edge of the rigid back and fit into a longitudinally arranged gap between the profiled member and the elongation.

11. A linear motion rolling guide device according to the claim 1, wherein the cross section shape of the outer surface of the elongation of the steel body and the opposed facing surface on the profiled member comprise each at least one convex groove which fit together to form at least one longitudinal arranged closed through hole as the return passage of the rolling elements.

12. A linear motion rolling guide device according to the claim 11, wherein a projection overhead on the end plate of the side frame, is engaged in the recess on both ends of the top face of the steel body and press the steel body from the top vertically downward to have a firm contact and exact positioning on the profiled member.

13. A linear motion rolling guide device according to the claim 1, wherein a longitudinal extended side wall is integrated on the endplate of the side frame; said side wall extends the lateral side of profiled member longitudinally to secure the joint of the turnaround channel and the return passage being covered by the side wall and avoid a direct invasion of the dusts.

14. A linear motion rolling guide device according to the claim 1, wherein a pair of retainers made from steel wire or string are provided against the drop out of the rolling elements from the slider when it is separated from the rail; its both ends are held and positioned by the recess on the end caps; on each rows of the rolling elements on the said rail a relief groove is provided against the contact with the retainer.

15. A linear motion rolling guide device according to the claim 1, wherein a lubrication hole is in the middle of the end cap and a laterally symmetric arranged lubrication channel connects the lubrication hole and the turnaround channel on bilateral side so that the lubricant can be filled from the lubrication hole into the re-circulation passage ways of the rolling elements; the lubrication channel is formed and closed when the end cap is fixed attached to the endplate of the side frames; to avoid the leakage of lubricant from the joint gap of the endplates, a design with longitudinally overlapped projection extended laterally from the joint of the two side frames and a design with overhangs extended from the end cap to close the joint gap from top and bottom are provided.

16. A linear motion rolling guide device comprising:

a longitudinal extended rail including a raceway on the right-and-left side; and a slider, by means of the rolling of a plurality of rows of rolling elements between the raceway on the right-and-left side of the rail and an opposite facing race way on the slider respectively, sliding relative to the rail; and a pair of end seals on both ends of the slider each having a elastic layer;

the elastic layer is molded with a plug, having the same form as and formed aligned to a lubrication hole on the slider for the lubrication injection from outward; the plug is partially connected with said layer and thereof can be unfolded while lubrication injection and plugged into said lubrication hole when the lubrication injection is fulfilled, so that the leakage of the lubricant from said lubrication hole is prevented.

* * * * *